Jan. 17, 1967  J. W. PENDLETON  3,298,065
APPARATUS FOR APPLYING ULTRASONIC VIBRATION
TO THERMOPLASTIC POLYMERS DURING FORMING
Original Filed Aug. 17, 1962
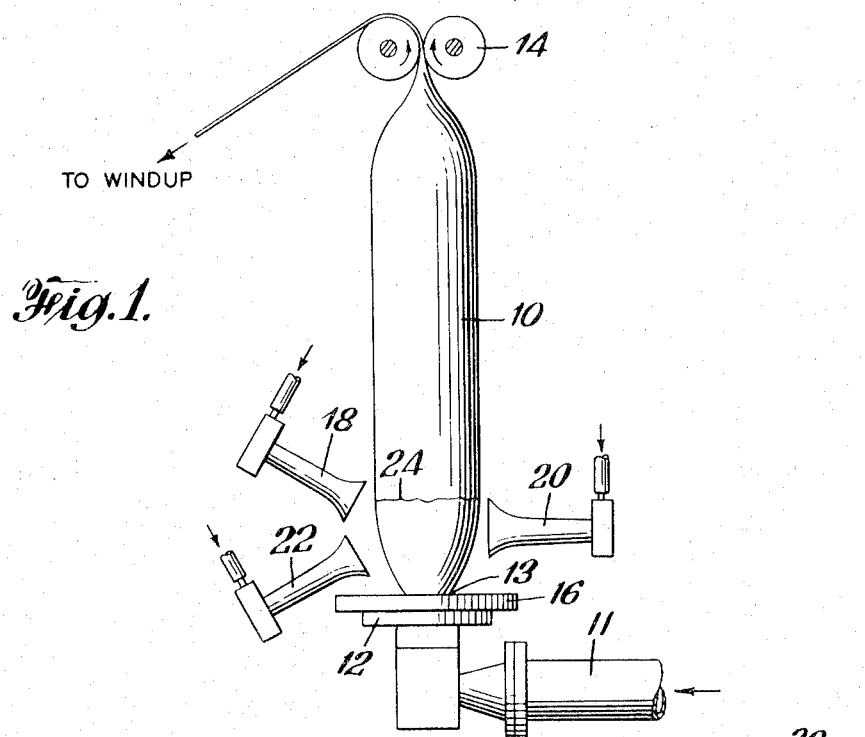
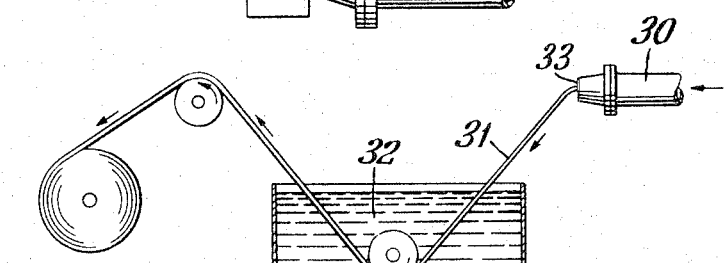
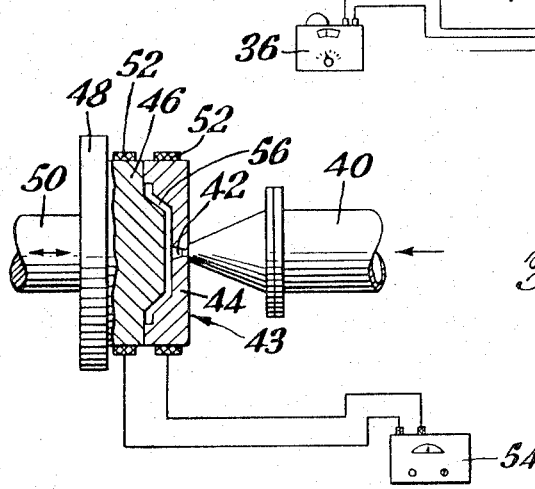
INVENTOR.
JAMES W. PENDLETON
BY
ATTORNEY

United States Patent Office 3,298,065
Patented Jan. 17, 1967

3,298,065
APPARATUS FOR APPLYING ULTRASONIC VIBRATION TO THERMOPLASTIC POLYMERS DURING FORMING
James W. Pendleton, South Charleston, W. Va., assignor to Union Carbide Corporation, a corporation of New York
Original application Aug. 17, 1962, Ser. No. 217,604, now Patent No. 3,246,055, dated Apr. 12, 1966. Divided and this application Oct. 5, 1965, Ser. No. 493,194
1 Claim. (Cl. 18—14)

This application is a division of co-pending application Serial No. 217,604, filed August 17, 1962, and now Patent No. 3,246,055, issued April 12, 1966.

This invention relates to the processing of thermoplastics, and more particularly to an improved apparatus for processing thermoplastics into a variety of contours exhibiting improvements in properties such as clarity, stress rupture resistance and stress cracking resistance.

Presently known methods of processing thermoplastics usually comprise heating a resinous material to above its softening temperature to form a viscous melt, subsequently shaping the melt by contact with a suitable die into a predetermined contour and thereafter cooling the molten contoured product below its softening point to a solid.

Various innovations have been added to this general thermoforming procedure. For example, it is well known to extrude thermoplastic material in seamless tubular form by extruding molten thermoplastic material through an annular die, forming a seamless tube of thermoplastic material, drawing the tube from the die and allowing the tube to cool.

It is also known to inflate the seamless thermoplastic tubing with a fluid, e.g., air, as the tubing is being withdrawn from the die, while the tubing is in the "formative plastic state," to yield tubing of a much greater diameter than that of the die orifice. The stretched tubing is drawn from the die by a pair of take-up rolls which also serve to collapse the tubing to a flattened state in which condition it is wound up on a take-up roll. The take-up rolls may be driven at a speed that stretches the tubing longitudinally while in the formative plastic state to impart stretching in both axial directions.

By the term "formative plastic state" as employed in the present specification and claims is meant that state of the thermoplastic material which exists within a critical temperature range, which varies from one thermoplastic to another in both breadth and temperature values, and is delimited at the lower end by the temperature at which the thermoplastic film is sufficiently set or hardened so that no expansion or stretching thereof occurs, and at the upper end by the temperature at which the temperature is so fluid that the polymer molecules relax after removal of the stretching force. The tubing is converted from said formative state to the set of hardened state (i.e., converted to that state which resists and is not further expanded by internally applied air pressure), by directing and applying a controlled volume of an external air flow around the tubing.

Another presently known method produces flat film with a conventional extrusion machine equipped with a slit die with adjustable lips, a cooling bath with a submerged guide roll, and a take-off system consisting of two pairs of nip rolls with rotary or fixed edge trimming knives interposed between them. The thermoplastic material is forced through the die orifice as an extrudate of predetermined thickness. From this point the product is drawn away from the die orifice by means of the nip roll take-off, at a rate accurately controlled to give a film of required thickness. In this extrusion process, the take-up rolls may draw at a higher linear velocity than the velocity of the film leaving the exit of the die. This difference in velocity effects a draw-down or diminishing of the thickness of the film so that the thickness of the finished film is less than the extruded thickness. The film is set to the final dimensions by immersion in water or other suitable coolants and is drawn to the windup roll.

In the processes utilizing a fluid cooling bath, the fluid is conventionally kept at the highest temperature which will effect solidification in a convenient period. If, on the one hand, the temperature of the bath is too high for a reasonable rate of solidification the take-up apparatus will subject the film to undesired stresses; if, on the other hand, the bath temperature is very low, the chilling effect on the thermoplastic will also cause undesirable stress in the film. Cooling at the highest temperature which will permit reasonable rates of solidification promotes film with less residual strain than if the film had been rapidly cooled as by quenching.

Compression molding, essentially a non-continuous process for producing complex shapes, forms thermoplastics by application of pressure thereto while confined in a mold cavity. The mold must subsequently be cooled to allow removal of the complex shape without distortion. The main consideration in the use of a particular thermoplastic in this process is the time required to cool the mold and eject the cooled molded piece for each cycle.

Injection molding because of the shorter time cycles involved is widely used as a thermoplastic shaping process. In injection molding machines, plastic molding powders are heated in an enclosed cylinder to above their softening temperature to form a viscous melt. A piston or ram pushes the flowable thermoplastic through the cylinder nozzle into the cavity of a cooled mold, where it cools and hardens quickly.

As will be noted, a highly critical part of all the foregoing thermoplastic processing techniques is the cooling of the formed thermoplastic melt to a solid. During this cooling, nucleation occurs in the melt resulting in the formation of "crystallites," which are ordered regions comprising molecular chains arranged in a regular geometric pattern. These highly ordered, crystalline regions are interdispersed among generally amorphous regions within most thermoplastic polymers.

Thermoplastic films containing crystallites are generally hazy. Individual crystallites, however, have dimensions on the order of only a few hundred Angstrom units, i.e., much less than a wavelength of visible light, and therefore do not themselves produce opacity. Nonetheless because they are normally organized into "spherulites," i.e., aggregates of crystallites, much larger than a wavelength of light, they render most crystalline thermoplastics opaque at any thickness. This organization of crystallites into spherulites is an outstanding morphological feature of melt-crystallized material.

The rate of cooling from the melt greatly affects the size and degree of structural perfection of the spherulites with large spherulites being formed as the result of a slow cooling process such as annealing and small imperfect spherulites being the result of a rapid cooling operation such as quenching.

The strength properties, as well as optical properties, of such melt crystallized materials as polyethylene are greatly affected by the size and degree of structural perfection of the spherulites. Thermoplastics with large well-developed spherulites will rupture when a load considerably lower than the tensile strength is applied for a long period of time and, hence, the presence of large spherulites is especially detrimental to the long-term stress bearing properties.

It has heretofore been attempted to improve the performance of thermoplastics, e.g., polyethylene which are to be subjected to long-term stress such as in piping by the use of higher molecular weight or narrower molecular weight distribution resins. A problem concomitant with the use of these expedients is that the higher molecular weight resin and/or the narrower distribution resins have higher melt viscosities and are only more difficultly extrudable, with increased extruder power requirements necessary. Another limitation of the desirability of narrow distribution resins being that such resins are prone to "melt fracture," a phenomenon which causes a rough surface on contours during extrusion. The effect can be obviated only by slow extrusion rates which are costly and require elaborate and expensive die designs.

It is, therefore, evident that the problems which exist in the processing of thermoplastics especially in obtaining good strength and clarity frequently arise during the cooling of the melt to a solid. Physical properties such as optical clarity and long-term stress, e.g., stress rupture resistance and stress cracking resistance as well as processing problems such as slow extrusion speed, high extruder power requirements and causation of undesirable phenomena such as "melt fracture" could be substantially obviated by reduction of the size of the spherulites formed during the cooling process.

It is, therefore, an object of the present invention to provide improved apparatus for subjecting thermoplastic contours to ultrasonic vibration.

It is another object to provide improved apparatus for the production of seamless tubular film.

It is still another object to provide improved apparatus for the production of flat film.

It is a still further object to provide improved apparatus for the production of molded thermoplastic articles.

These and other objects are accomplished in accordance with the present invention by reducing a thermoplastic resin to a flowing condition, forming the resin into a desired contour and as a novel step, during at least a portion of the cooling thereof to its final shape and while in the formative plastic state, subjecting the thermoplastic resin to ultrasonic vibration whereby the growth and degree of perfection of the spherulites within the cooling thermoplastic is effectively reduced.

The necessary vibration is provided by contacting the cooling polymer or any energy transmitting medium itself in contact with the cooling polymer, with a suitably activated vibrator or other source capable of providing ultrasonic energy.

As applied to film fabrication, the present invention utilizes ultrasonic vibration in the impinging air coolant utilized in the tubular process of film extrusion. The air transmits the vibrations to the film to break down the spherulites to smaller entities and thus improve optical clarity.

Ultrasonic vibration can also be applied to film made by the water bath flat-film process. Here it is only necessary to vibrate the cooling water through which the film is passed.

It has been found that ultrasonic vibration can be transmitted through solids as well as fluids. For example, ultrasonic vibrations can be transmitted through mold cavities to the thermoplastic contained therein in such processes as injection or compression molding.

While not wishing to be bound to any theory or mechanism, it is believed that the ultrasonic vibration imparted to the resin causes the spherulites in the solidifying resin to be smaller and less well-ordered. The manner in which ultrasonic vibration accomplishes this purpose is not known. It may be a direct effect of the molecular agitation caused by the ultrasonic wave motion, the agitation simply interfering with the alignment processes necessary to grow large spherulites. On the other hand, it is possible that the ultrasonic waves cause faster cooling of the molten resin. According to this theory, the molecular agitation at the resin-coolant interface results in better heat transfer from the hot resin to the coolant.

Ultrasonic vibration can be obtained from suitably activated piezoelectric or magnetostrictive transducers, air-jet monowhistles, or from any other source capable of providing a frequency above 20 kilocycles per second (kcs.) which is the usually accepted dividing frequency between sonic and ultrasonic sound. A preferred source, however, would be one capable of providing from 20 to about 90 kcs.

The frequency to be used in any thermoforming process is in part dictated by the particular shape of the extrudable being treated. While any frequency between 20 kcs. and 90 kcs. can be used, the most efficient transmittal of ultrasonic vibration is achieved when the ultrasonic waves impinge uniformly on all surfaces of the extrudate being cooled. Also, there is less loss by attenuation if the sources of ultrasonic waves are close to the cooling extrudate. These considerations imply certain restrictions on the size and shape of the transducer for most efficient operation.

Ultrasonic energy can be transmitted through liquids, solids, and gases by a series of compressions and rarefactions of the medium through which it is traveling. In liquid systems, the effects of ultrasonics have been attributed to cavitation, a complex phenomenon of pressure peaks set up by the formation and collapse of small bubbles or cavities.

The intensity of ultrasonic vibration required to reduce the size and degree of structural perfection of spherulites formed in thermoplastic fabrication processes can vary considerably. The contact time and the capacitance of the system, i.e., geometry, contacting medium, et cetera, dictate the most suitable level of intensity which can readily be determined by one having ordinary skill in the art. Contact time during the cooling cycle, and/or the intensity of the ultrasonic vibration should be at least sufficient to reduce the size of the spherulites formed in the cooled polymer. Generally, intensities comparable to those required to attain the threshold of cavitation in liquid systems have been found most desirable. This has been accomplished by the use of conventional piezoelectric of magnetostrictive transducers which convert the high-frequency electrical output of a generator into a high-frequency mechanical vibration or wave.

Piezoelectric transducers are natural or synthetic crystals which have the inherent ability to undergo mechanical deformation, or changes in dimensions, when an electrical potential is placed across the crystal. Material such as lithium titanate, barium titanate, ammonium dihydrogen phosphate, and the like, though not exhibiting a true piezoelectric effect, do possess electrostrictive characteristics and have been used successfully. In a preferred embodiment of the present invention piezoelectric transducers are utilized.

A magnetostrictive transducer is a similar device which makes use of the ability of certain metals to undergo minute expansions and contractions when subjected to an oscillating magnetic field. These effects are of the greatest magnitude in such metals as iron, nickel, cobalt, and their alloys.

An air-jet monowhistle can also be used as a source of ultransonic energy. The monowhistle is comprised of a resonant chamber and an exponential horn which is tapered exponentially to focus the ultrasonic vibration on the material.

The procedure is most useful for synthetic organic spherulite-forming thermoplastic polymers in which spherulites grow large and adversely affect the properties of the product. Polyolefins, vinyl polymers or copolymers, vinylidene chloride/vinyl chloride copolymers, isotactic polystylrene, poly(alkylene oxides), poly(ethylene terephthalate) and the like are examples in this category. Practice of this invention however, does not depend upon the chemical make-up of the polymer.

In the drawing:

FIG. 1 is a schematic view in elevation of an apparatus for forming tubular thermoplastic film over an air mandrel illustrating the use of air-jet monowhistles.

FIG. 2 is a schematic view in elevation, partly in section, of an apparatus for forming flat thermoplastic film illustrating the use of transducers.

FIG. 3 is a schematic view, partly in section, of an apparatus for forming thermoplastic articles illustrating the application of transducers to another embodiment of the present invention. In this embodiment, conventional thermoforming techniques wherein the polymer is cooled by coming into contact with cold metal can be modified. As examples, there can be cited, injection molding, blow molding, chillroll film extrusion, and mandrel-cooled tubular film extrusion. In such applications, the ultrasonic vibrations are imparted to the resin through the surrounding cold metal dies or chillrolls. Other solids forming means, e.g., wood, thermoset resins, et cetera can be similarly modified.

Referring now to FIG. 1, thermoplastic tubular film 10 is extruded by extruder 11, shaped into a tube by die 12 having an annular orifice 13. The tube is stretched by being drawn over a mandrel of trapped air between the annular orifice 13 and nip rolls 14 which pass the film to wind-up. A cooling ring 16 spaced above the die orifice 13 impinges a blast of cold air onto the outside of the tubing. Air-jet monowhistles 18, 20 and 22 are directed at the tubular film below the frost line 24, i.e., that line or area above which the tubing is no longer in its formative plastic state. Each monowhistle consists of a resonant chamber and an exponential horn and is capable of maintaining a frequency range of approximately 20 to 60 kcs. using air pressure between 40 and 75 p.s.i.

The ultrasonic exposures are made in the area above the annual orifice 13 and below the frost line 24. The position of the monowhistle can be varied within these limits to give optimum results depending upon the nature of the thermoplastic substance being formed. It is considered critical, however, that the ultrasonic vibrations be applied while the thermoplastic material is in the formative plastic state. Moreover, to obtain optimum results, the vibrations should encompass the entire perimeter of the tube. Therefore, it is also considered within the scope of this invention to transmit the ultrasonic energy through the cooling ring 16 itself, thereby providing a more uniform and complete exposure.

Similar results are secured with flat film extrusion through a slot die by positioning the monowhistles above the film leaving the extruder, or by application of the ultrasonic energy through the cooling air means or through the chill roll itself if such a technique is employed. The monowhistles are conveniently adjusted by positioning a horn above a beaker of water and adjusting the air pressure until maximum cavitation occurs. The unit is then positioned, with air pressure remaining fixed, at the same distance from the film as that which promotes maximum cavitation in water. For the most part, a distance of 2–3 inches has been found to be most effective; however, as is apparent to those in the art, a greater or less distance can be employed without departing from the scope of the present invention.

Referring now to FIG. 2, the extruder 30 having a slit die 33 forms a flat thermoplastic film 31. The flat film 31 is passed directly into bath 32 provided with transducers 34 driven by an ultrasonic generator 36. The rate of extrusion and takeup can be varied depending upon the amount of ultrasonic vibration desired.

Referring to FIG. 3, extruder 40 forces molten thermoplastic through sprue 42 into a split mold 43 comprised of female mold 44 and male mold 46, said split mold 43 being opened and closed by platen 48 driven by press ram 50, and also being cold enough to harden the thermoplastic sufficiently for rapid ejection. Transducers 52 driven by an ultrasonic generator 54 are directly affixed to the split mold 43 to provide ultrasonic vibration to the molded article 56 through the surrounding metal of the split mold.

The following examples are cited to illustrate the present invention and are not intended to limit it in any manner.

*Example I*

Using the apparatus of FIG. 1, high density (0.95) polyethylene tubing was subjected to inline ultrasonic vibrations produced by air-jet monowhistles. The monowhistles consist of a resonant chamber and exponential horn; the unit covers the frequency range of approximately 20 to 60 kcs. in four states. Air pressure between 40 and 75 p.s.i. are most effective in producing ultrasonic vibrations with this assembly. The monowhistle was adjusted by positioning the horn above a beaker of water and adjusting the air pressure until maximum cavitation occurs. Using the same air pressure, the unit is then positioned at the same distance from the film as that which pointed maximum cavitation in water. A distance of 2–3 inches is considered most effective. Definite improvements in film clarity resulted.

*Example II*

Using the apparatus of FIG. 2, 0.95 density polyethylene was extruded in the form of a belt with dimensions of approximately 0.75 x 0.050 inch from an extruder having a barrel temperature maintained at 180° C. The belt was passed directly into a 2-gallon bath to which was directly attached a set of transducers driven by an ultrasonic generator. This assembly operates at a frequency of 35–50 kcs. with an output of 125–500 watts. About ⅔ of the potential output is actually used. The bath is maintained at temperatures between 90–100° C. The belt is extruded at rates of 4 to 10 feet per minute. The total travel distance in the bath is about 6 inches. The thus treated film showed increased impact strength and resistance to stress cracking, while exhibiting no change in density indicating that the effects on crystallinity are of order or arrangement rather than degree or amount. The control samples, those formed in the same manner but not subjected to ultrasonic vibrations, contained large, well ordered spherulites such as are normally obtained by annealing treatments. The samples receiving ultrasonic treatment had a more random structure with no apparent well ordered spherulites.

*Example III*

Using the apparatus of FIG. 3, high density polyethylene (0.95) is forced into a mold by the plunger or ram of a conventional injection molding system, said system being capable of imposing a pressure between 12,000 to 30,000 p.s.i. The barrel temperature is maintained between 175°–185° C. while the mold is heated to about 90°–100° C. A set of transducers are affixed directly to the mold and are driven by an ultrasonic generator similar to that of Example II. The transducers, when activated provide ultrasonic vibrations to the molded article through the surrounding metal of the mold. Samples subjected to ultrasonic vibration are found to possess higher impact strength than control samples similarly formed but not subjected to said ultrasonic vibrations.

What is claimed is:

In apparatus for the production of blown seamless tubular film comprising a die having an annular orifice, means to extrude a molten thermoplastic through said orifice to form seamless tubing, means to continuously withdraw the tubing from the point of extrusion, means to maintain a substantially constant bubble of a gaseous medium in the section of the tubing extending between the point of extrusion and a point spaced therefrom, cooling means encircling the exterior surface of the section of the inflated tubing in the vicinity of the die, the improvement which comprises a vibrator capable of imparting ultrasonic vibrations above about 20 kilocycles per second to impart molecular agitation to the entire periphery of the inflated tubing, said vibrator being positioned in spaced relation about the tubing in the region wherein the tubing is in the formative plastic state.

References Cited by the Examiner

UNITED STATES PATENTS

| | | | |
|---|---|---|---|
| 2,954,271 | 9/1960 | Cenzato | 264—23 |
| 3,041,670 | 7/1962 | Broderson | 264—23 |

FOREIGN PATENTS 868,597　5/1961　Great Britain.

J. SPENCER OVERHOLSER, *Primary Examiner.*

W. L. McBAY, *Assistant Examiner.*